(12) United States Patent
Schmitjes

(10) Patent No.: US 10,563,696 B2
(45) Date of Patent: Feb. 18, 2020

(54) SLIDE BEARING COMPRISING A PRIMER SYSTEM AS ADHESION PROMOTER

(71) Applicant: SAINT-GOBAIN PERFORMANCE PLASTICS PAMPUS GMBH, Willich (DE)

(72) Inventor: Olaf Schmitjes, Krefeld (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 16/144,164

(22) Filed: Sep. 27, 2018

(65) Prior Publication Data

US 2019/0024714 A1  Jan. 24, 2019

Related U.S. Application Data

(60) Division of application No. 15/136,207, filed on Apr. 22, 2016, now Pat. No. 10,113,588, which is a
(Continued)

(51) Int. Cl.
*F16C 33/20* (2006.01)
*B32B 15/08* (2006.01)
(Continued)

(52) U.S. Cl.
CPC .............. *F16C 33/206* (2013.01); *B05D 7/14* (2013.01); *B05D 7/584* (2013.01); *B32B 15/08* (2013.01);
(Continued)

(58) Field of Classification Search
CPC ........ B32B 15/08; F16C 33/04; F16C 33/201; F16C 33/205; Y10T 156/10
See application file for complete search history.

(56) References Cited

U.S. PATENT DOCUMENTS 3,692,558 A 9/1972 Werner, Jr.
3,697,309 A 10/1972 Werner, Jr.
(Continued)

FOREIGN PATENT DOCUMENTS

CA 1322747 10/1993
CA 2152279 7/1994
(Continued)

OTHER PUBLICATIONS

International Search Report and Written Opinion for PCT/EP2013/063672, dated Oct. 2, 2013, 7 pgs.
(Continued)

*Primary Examiner* — Taiwo Oladapo
(74) *Attorney, Agent, or Firm* — Abel Schillinger, LLP; Chi Suk Kim

(57) ABSTRACT

A slide bearing can include a metal support, a primer layer, an adhesive layer applied directly thereto, and a sliding layer applied to the adhesive layer. The primer layer can include an oligomeric condensate of at least one silanol selected from the group having the formula:

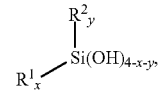

wherein x is 1 or 2, y is 0 or 1.
The moieties $R^1$ and $R^2$ can be the same or different. The moieties $R^1$ and $R^2$ can be selected from the group consisting of methyl, ethyl, n-propyl, i-propyl, and a functionalized alkyl group $R'—(CH_2)_z—$, wherein z is at least 1. Slide bearings comprising a primer system based on silanol oli-
(Continued)

gomeric condensates show improved peel strength than their analogous slide bearings lacking the primer system.

20 Claims, 1 Drawing Sheet

Related U.S. Application Data continuation of application No. 13/931,010, filed on Jun. 28, 2013, now abandoned.

(60) Provisional application No. 61/666,336, filed on Jun. 29, 2012.

(51) Int. Cl.
| | | |
|---|---|---|
| C09J 7/28 | (2018.01) | |
| F16C 33/04 | (2006.01) | |
| B05D 7/14 | (2006.01) | |
| B05D 7/00 | (2006.01) | |
| C09D 5/00 | (2006.01) | |
| C09J 123/08 | (2006.01) | |
| C09J 127/18 | (2006.01) | |

(52) U.S. Cl.
CPC ............... *C09D 5/002* (2013.01); *C09J 7/28* (2018.01); *C09J 123/0892* (2013.01); *C09J 127/18* (2013.01); *F16C 33/04* (2013.01); *F16C 33/201* (2013.01); *F16C 33/208* (2013.01); *C09J 2400/163* (2013.01); *C09J 2427/00* (2013.01); *F16C 2204/60* (2013.01); *F16C 2206/00* (2013.01); *F16C 2208/00* (2013.01); *F16C 2208/02* (2013.01); *F16C 2208/30* (2013.01); *F16C 2208/32* (2013.01); *F16C 2208/58* (2013.01); *F16C 2223/30* (2013.01); *F16C 2226/40* (2013.01); *F16C 2240/40* (2013.01); *F16C 2240/60* (2013.01); *F16C 2240/94* (2013.01); *F16C 2300/02* (2013.01); *Y10T 156/10* (2015.01)

(56) References Cited

U.S. PATENT DOCUMENTS

| | | |
|---|---|---|
| 3,911,161 A | 10/1975 | Nord et al. |
| 4,011,361 A | 3/1977 | Vassiliou et al. |
| 4,016,125 A | 4/1977 | Vassiliou et al. |
| 4,039,713 A | 8/1977 | Vassiliou |
| 4,049,863 A | 9/1977 | Vassiliou |
| 4,070,525 A | 1/1978 | Vassiliou et al. |
| 4,319,942 A | 3/1982 | Brenner |
| 4,413,019 A | 11/1983 | Brenner |
| 4,483,951 A | 11/1984 | Brenner |
| 4,548,989 A | 10/1985 | Allen et al. |
| 4,592,782 A | 6/1986 | Davies |
| 4,595,718 A | 6/1986 | Allen et al. |
| 4,605,695 A | 8/1986 | Sakamaki et al. |
| 4,624,887 A | 11/1986 | Bickle et al. |
| 4,655,944 A | 4/1987 | Mori |
| 4,812,367 A | 3/1989 | Bickle |
| 4,868,234 A | 9/1989 | Tabb et al. |
| 4,925,892 A | 5/1990 | Tabb et al. |
| 5,039,575 A | 8/1991 | Mori et al. |
| 5,230,961 A | 7/1993 | Tannenbaum |
| 5,239,026 A | 8/1993 | Babirad et al. |
| 5,364,682 A | 11/1994 | Tanaka et al. |
| 5,536,583 A | 7/1996 | Roberts et al. |
| 5,573,846 A | 11/1996 | Harig et al. |
| 5,686,176 A | 11/1997 | Adam et al. |
| 5,863,657 A | 1/1999 | Kawashima et al. |
| 5,882,466 A | 3/1999 | Grootaert et al. |
| 5,911,513 A | 6/1999 | Tsuji et al. |
| 5,927,862 A | 7/1999 | Debnam et al. |
| 6,001,205 A | 12/1999 | Mauro |
| 6,085,797 A | 7/2000 | Grabaum et al. |
| 6,140,410 A | 10/2000 | Kolouch |
| 6,183,137 B1 | 2/2001 | Kojima et al. |
| 6,183,869 B1 * | 2/2001 | Okuda ................ B05D 5/083 428/411.1 |
| 6,258,413 B1 | 7/2001 | Woelki et al. |
| 6,312,814 B1 | 11/2001 | Kolouch |
| 6,316,534 B1 | 11/2001 | Shimokusuzono et al. |
| 6,372,284 B1 | 4/2002 | Hess et al. |
| 6,376,061 B1 | 4/2002 | Adam |
| 6,413,588 B1 | 7/2002 | Pettus et al. |
| 6,425,977 B2 | 7/2002 | McDonald et al. |
| 6,528,143 B1 | 3/2003 | Adam et al. |
| 6,531,950 B1 | 3/2003 | Becker et al. |
| 6,565,257 B1 | 5/2003 | Kennedy et al. |
| 6,569,816 B2 | 5/2003 | Oohira et al. |
| 6,726,994 B1 | 4/2004 | Araki et al. |
| 6,759,129 B2 | 7/2004 | Fukushi |
| 6,770,378 B1 | 8/2004 | Lehmann |
| 7,022,402 B2 | 4/2006 | Lacourt |
| 7,025,853 B2 | 4/2006 | Kesselmayer |
| 7,241,817 B2 | 7/2007 | Bonnet et al. |
| 7,491,446 B2 | 2/2009 | Ueda et al. |
| 7,581,734 B1 | 9/2009 | McLeod |
| 7,829,618 B2 | 11/2010 | Longo et al. |
| 7,887,922 B2 | 2/2011 | Mayston et al. |
| 7,910,527 B2 | 3/2011 | Sawyer et al. |
| 7,942,581 B2 | 5/2011 | Leonardelli |
| 8,349,773 B2 | 1/2013 | Takayanagi et al. |
| 8,646,977 B2 | 2/2014 | Adam |
| 8,802,602 B2 | 8/2014 | Schmitjes et al. |
| 9,297,416 B2 | 3/2016 | Ziegler et al. |
| 2002/0011414 A1 | 1/2002 | Bank et al. |
| 2002/0117280 A1 | 8/2002 | Howle et al. |
| 2003/0024380 A1 | 2/2003 | Shimo et al. |
| 2003/0044553 A1 | 3/2003 | Ramanathan et al. |
| 2003/0049485 A1 | 3/2003 | Brupbacher et al. |
| 2003/0079847 A1 | 5/2003 | Howle et al. |
| 2003/0104223 A1 | 6/2003 | Ferm et al. |
| 2003/0158338 A1 | 8/2003 | Jazenski et al. |
| 2003/0207118 A1 | 11/2003 | Fukushi |
| 2004/0006867 A1 | 1/2004 | Becker et al. |
| 2004/0071987 A1 | 4/2004 | Bate |
| 2004/0096610 A1 | 5/2004 | Ramanathan et al. |
| 2004/0115465 A1 | 6/2004 | Bickle et al. |
| 2004/0115477 A1 | 6/2004 | Nesbitt |
| 2004/0116792 A1 | 6/2004 | Nesbitt |
| 2004/0142181 A1 | 7/2004 | Marsella et al. |
| 2004/0167263 A1 | 8/2004 | Bate |
| 2004/0228555 A1 | 11/2004 | Kim et al. |
| 2005/0025977 A1 | 2/2005 | Adam et al. |
| 2005/0048218 A1 | 3/2005 | Weidman |
| 2005/0069778 A1 | 3/2005 | Bonnet et al. |
| 2005/0090602 A1 | 4/2005 | Koshikawa |
| 2005/0185867 A1 | 8/2005 | Chu et al. |
| 2005/0228441 A1 | 10/2005 | Wood et al. |
| 2005/0233152 A1 | 10/2005 | Bate |
| 2005/0266170 A1 | 12/2005 | Nesbitt |
| 2006/0029795 A1 | 2/2006 | Sawyer et al. |
| 2006/0110601 A1 | 5/2006 | Hennessey |
| 2006/0229424 A1 | 10/2006 | Griswold et al. |
| 2006/0247360 A1 | 11/2006 | Halasa et al. |
| 2006/0247369 A1 | 11/2006 | Griswold et al. |
| 2006/0247370 A1 | 11/2006 | Frye et al. |
| 2007/0021544 A1 | 1/2007 | Yanase et al. |
| 2007/0031275 A1 | 2/2007 | Nogawa et al. |
| 2007/0092173 A1 | 4/2007 | Tsuji et al. |
| 2007/0106294 A1 | 5/2007 | Nesbitt |
| 2007/0110937 A1 | 5/2007 | Lokere et al. |
| 2007/0123853 A1 | 5/2007 | Nesbitt |
| 2007/0173590 A1 | 7/2007 | Longo et al. |
| 2007/0177833 A1 | 8/2007 | Egami et al. |
| 2007/0225177 A1 | 9/2007 | Murase et al. |
| 2007/0232502 A1 | 10/2007 | Tsutsui et al. |
| 2007/0269151 A1 | 11/2007 | Nardi et al. |
| 2007/0281872 A1 | 12/2007 | Schubert et al. |
| 2007/0298217 A1 | 12/2007 | Chen et al. |
| 2008/0032060 A1 | 2/2008 | Nesbitt |

(56) References Cited

U.S. PATENT DOCUMENTS

| | | | |
|---|---|---|---|
| 2008/0050509 A1 | 2/2008 | Nesbitt | |
| 2008/0057251 A1 | 3/2008 | Griswold et al. | |
| 2008/0102307 A1 | 5/2008 | Zidar | |
| 2008/0113206 A1 | 5/2008 | Hoy et al. | |
| 2008/0159671 A1 | 7/2008 | Leonardelli | |
| 2008/0226933 A1 | 9/2008 | Bickle et al. | |
| 2009/0092827 A1 | 4/2009 | Robinson | |
| 2009/0304957 A1 | 12/2009 | Jamil et al. | |
| 2010/0028684 A1 | 2/2010 | Mariscal et al. | |
| 2010/0047467 A1 | 2/2010 | Nesbitt | |
| 2010/0092119 A1 | 4/2010 | Angenheister | |
| 2010/0098360 A1 | 4/2010 | Schmitjes et al. | |
| 2010/0119188 A1 | 5/2010 | Hsueh et al. | |
| 2010/0197849 A1 | 8/2010 | Momose et al. | |
| 2010/0215834 A1 | 8/2010 | Nesbitt | |
| 2010/0239883 A1 | 9/2010 | Okladek et al. | |
| 2010/0290726 A1 | 11/2010 | Schlipf et al. | |
| 2010/0301525 A1 | 12/2010 | Price et al. | |
| 2010/0304063 A1 | 12/2010 | McCrea et al. | |
| 2011/0023726 A1 | 2/2011 | Nesbitt | |
| 2011/0049834 A1* | 3/2011 | Natu | F16C 11/04 |
| | | | 280/279 |
| 2011/0159229 A1 | 6/2011 | Doehle et al. | |
| 2011/0262064 A1 | 10/2011 | Burgeff et al. | |
| 2011/0268944 A1 | 11/2011 | Adam et al. | |
| 2011/0305874 A1 | 12/2011 | Thoumazet et al. | |
| 2012/0008887 A1 | 1/2012 | Adam | |
| 2012/0275731 A1 | 11/2012 | Ziegler et al. | |
| 2013/0183488 A1 | 7/2013 | Liao et al. | |
| 2013/0183539 A1 | 7/2013 | Guo et al. | |
| 2013/0195388 A1 | 8/2013 | Ishii et al. | |
| 2014/0010484 A1 | 1/2014 | Schmitjes | |
| 2014/0024563 A1 | 1/2014 | Heidecker et al. | |
| 2014/0329728 A1 | 11/2014 | Peng et al. | |

FOREIGN PATENT DOCUMENTS

| | | |
|---|---|---|
| CA | 2684543 | 10/2008 |
| CN | 1037481 | 11/1989 |
| CN | 1261386 | 7/2000 |
| CN | 1401898 | 3/2003 |
| CN | 1659028 | 8/2005 |
| CN | 1705830 | 12/2005 |
| CN | 1756911 | 4/2006 |
| CN | 1823132 | 8/2006 |
| CN | 101061191 | 10/2007 |
| CN | 101126417 | 2/2008 |
| CN | 101413543 | 4/2009 |
| CN | 101715392 | 5/2010 |
| CN | 102271906 | 12/2011 |
| DE | 1932343 | 1/1971 |
| DE | 1961833 | 6/1971 |
| DE | 3021369 | 12/1981 |
| DE | 3343697 | 6/1984 |
| DE | 3401804 | 7/1985 |
| DE | 3534242 | 3/1987 |
| DE | 3601569 | 7/1987 |
| DE | 3912716 | 10/1990 |
| DE | 19823609 | 12/1999 |
| DE | 102005046571 | 4/2007 |
| DE | 102008055194 | 7/2010 |
| EP | 0008542 | 3/1980 |
| EP | 0119815 | 9/1984 |
| EP | 0217462 | 4/1987 |
| EP | 0223268 | 3/1989 |
| EP | 0232922 | 6/1989 |
| EP | 0394518 | 10/1990 |
| EP | 0650987 | 5/1995 |
| EP | 0848031 | 6/1998 |
| EP | 0988898 | 3/2000 |
| EP | 1077230 | 2/2001 |
| EP | 1724104 | 11/2006 |
| EP | 1892429 | 2/2008 |
| FR | 1354161 | 3/1964 |
| GB | 1265140 | 3/1972 |
| GB | 1338234 | 11/1973 |
| GB | 1472079 | 4/1977 |
| GB | 2123430 | 2/1984 |
| JP | S61211525 | 9/1986 |
| JP | H04505335 | 9/1992 |
| JP | 7018035 | 1/1995 |
| JP | H07173446 | 7/1995 |
| JP | H09117095 | 5/1997 |
| JP | 10331855 | 12/1998 |
| JP | 2000117888 | 4/2000 |
| JP | 2000153575 | 6/2000 |
| JP | 2000192961 | 7/2000 |
| JP | 2001511502 | 8/2001 |
| JP | 2002194380 | 7/2002 |
| JP | 2004019758 | 1/2004 |
| JP | 2004035890 | 2/2004 |
| JP | 2004358904 | 12/2004 |
| JP | 2005015793 | 1/2005 |
| JP | 2005035300 | 2/2005 |
| JP | 2006111885 | 4/2006 |
| JP | 2007145894 | 6/2007 |
| JP | 2008264305 | 11/2008 |
| JP | 2010525245 | 7/2010 |
| KR | 20050106066 | 11/2005 |
| KR | 20100012028 | 2/2010 |
| KR | 101237477 | 2/2013 |
| MX | 2009011322 | 12/2009 |
| RU | 2009139818 | 5/2011 |
| RU | 2438877 | 1/2012 |
| WO | 1994015999 | 7/1994 |
| WO | 1997027003 | 7/1997 |
| WO | 1998044545 | 10/1998 |
| WO | 1999001991 | 1/1999 |
| WO | 2000029210 | 5/2000 |
| WO | 2002096644 | 12/2002 |
| WO | 2003027522 | 4/2003 |
| WO | 2004056751 | 7/2004 |
| WO | 2004056754 | 7/2004 |
| WO | 2008094652 | 8/2008 |
| WO | 2008096097 | 8/2008 |
| WO | 2008121682 | 10/2008 |
| WO | 2008128579 | 10/2008 |
| WO | 2009144495 | 12/2009 |
| WO | 2010038137 | 4/2010 |
| WO | 2010076307 | 7/2010 |
| WO | 2010138172 | 12/2010 |
| WO | 2012149447 | 11/2012 |
| WO | 2013101905 | 7/2013 |
| WO | 2013101928 | 7/2013 |
| WO | 2014001524 | 1/2014 |
| WO | 2014049137 | 4/2014 |

OTHER PUBLICATIONS

International Search Report and Written Opinion for PCT/US2012/071775, dated Apr. 24, 2013, 10 pgs.
International Search Report and Written Opinion for PCT Application PCT/US2012/071814, dated Apr. 12, 2013, 12 pgs.
French Search Report from FR Application No. 1104125 dated Sep. 24, 2012, 3 pgs.
French Search Report from FR Application No. 1457516 dated Jan. 13, 2015, 6 pgs.
Briscoe, B. J. et al., "The friction and wear of Poly(tetrafluoroethylene)-Poly(etheretherketone) composites: an initial appraisal of the optimum composition," Wear, Elsevier Sequoia, Lausanne, CH, vol. 108, Jan. 1, 1986, pp. 357-374, XP002351273.
Zhang, Z. et al., "Wear of PEEK composites related to their mechanical performances," Tribology International Butterworth Scientific LDT, Guildford, GB, vol. 37, Jan. 1, 2004, pp. 271-277, XP002351274.
Supplementary European Search Report in European Application No. 12862673, search completed Dec. 1, 2015, 2 pages.
International Search Report for PCT/EP2007/060736, 1 pg.
International Search Report and Written Opinion for PCT/US2012/035621, dated Nov. 29, 2012, 11 pages.

(56) References Cited

OTHER PUBLICATIONS

International Search Report and Written Opinion for PCT/EP2013/070239 dated Jan. 8, 2014, 12 pgs.
Halar ECTFE Electrostatic Powder Coating Processing Manual, downloaded on Oct. 28, 2017 from http://eflon.co.il/userfiles/file/Halar-processing-manual.pdf (pp. 1-24), 2009 (no month).

* cited by examiner

SLIDE BEARING COMPRISING A PRIMER SYSTEM AS ADHESION PROMOTER

CROSS-REFERENCE TO RELATED APPLICATION(S)

This application is a divisional of and claims priority under 35 U.S.C. § 120 to U.S. patent application Ser. No. 15/136,207 entitled "SLIDE BEARING COMPRISING A PRIMER SYSTEM AS ADHESION PROMOTER," by Olaf Schmitjes, filed Apr. 22, 2016, which is a continuation of and claims priority under 35 U.S.C. § 120 to U.S. patent application Ser. No. 13/931,010 entitled "SLIDE BEARING COMPRISING A PRIMER SYSTEM AS ADHESION PROMOTER," by Olaf Schmitjes, filed Jun. 28, 2013, which claims priority under 35 U.S.C. § 119(e) to U.S. Patent Application No. 61/666,336 entitled "SLIDE BEARING COMPRISING A PRIMER SYSTEM AS ADHESION PROMOTER," by Olaf Schmitjes, filed Jun. 29, 2012, which are assigned to the current assignee hereof and incorporated herein by reference in their entireties.

FIELD OF THE DISCLOSURE

The disclosure relates to a slide bearing comprising a metal support, a primer layer, an adhesive layer, and a sliding layer. The primer layer includes a silanol based oligomeric condensate.

BACKGROUND

Maintenance-free slide bearings which comprise a layer structure having a metallic support material, an intermediate layer and a sliding layer applied thereto have been known for a long time in a variety of forms from the prior art and are used in a wide variety of technical fields, for example in the field of automotive engineering.

EP 0 394 518 A1 describes a multilayer slide bearing material in which the metallic support material preferably consists of cold-rolled steel on which a layer of a copolymer of perfluoro(alkyl vinyl ether) and tetrafluoroethylene has been applied as intermediate layer. A sliding layer composed of a PTFE compound material is in turn applied to the intermediate layer. In this slide bearing material, the intermediate layer has the function of establishing firm adhesion of the sliding layer to the support material. In order firstly to ensure adhesion of the intermediate layer to the support material, the surface of the metallic support material in this known slide bearing material has to be pretreated in a suitable manner by wet chemical means. The best results appear to be achieved by chromating of the surface of the metallic support. However, this process is problematical for a variety of reasons, including environmental issues and others. As such, there is a continued need for improved maintenance free slide bearings.

Therefore, it would be advantageous if a slide bearing could be produced that would not require extensive pretreatment of the metal support without sacrificing adhesive strength between the metal support and the sliding layer.

SUMMARY OF THE INVENTION

In a first embodiment, a slide bearing can include a metal support, a primer layer, an adhesive layer applied directly thereto, and a sliding layer applied to the adhesive layer. The primer layer can include an oligomeric condensate of at least one silanol selected from the group having the formula:

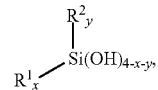

wherein x is 1 or 2, y is 0 or 1.

The moieties $R^1$ and $R^2$ can be the same or different. The moieties $R^1$ and $R^2$ can be selected from the group consisting of methyl, ethyl, n-propyl, i-propyl, and a functionalized alkyl group $R'$—$(CH_2)_z$—, wherein z is at least 1. In embodiments, z can be 1, 2, 3, 4, or 5. In other embodiments, z is not greater than 10, such as not greater than 8, not greater than 7, not greater than 6, not greater than 5, not greater than 4, or not greater than 3.

The adhesive layer can include perfluoroalkoxyethylene (PFA), tetrafluoroethylene-perfluoro(methyl vinyl ether) copolymer (MFA), ethylene tetrafluoroethylene (ETFE), tetrafluoroethylene-hexafluoropropylene (FEP), and any combination thereof.

In another aspect, a method for producing a slide bearing includes applying a primer liquid onto a metal support. The primer liquid can include at least one silanol or an oligomeric condensate of at least one silanol. The silanol can be selected from the group having the formula

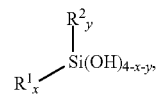

wherein x is 1 or 2, y is 0 or 1.
The moieties $R^1$ and $R^2$ can be the same or different. The moieties $R^1$ and $R^2$ can be selected from the group consisting of methyl, ethyl, n-propyl, i-propyl, and a functionalized alkyl group $R'$—$(CH_2)_z$—, wherein z is at least 1. In embodiments, z can be 1, 2, 3, 4, or 5. In other embodiments, z is not greater than 10, such as not greater than 8, not greater than 7, not greater than 6, not greater than 5, not greater than 4, or not greater than 3.

The method can further include drying the primer liquid to form a primer layer. The method can further include applying an adhesive precursor onto the primer layer to form an adhesive layer. Moreover, the method can include applying a sliding layer onto the adhesive layer.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a slide bearing can include a metal support, a primer layer, an adhesive layer applied directly thereto, and a sliding layer applied to the adhesive layer, in which adhesion of the sliding layer to the support material is ensured over the long term. Moreover the method of forming the slide bearing can be without use of ecologically problematical processes for surface pretreatment.

Figure 1:
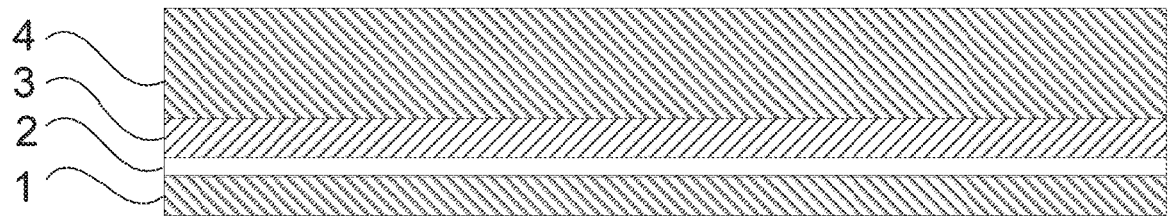
FIG. 1 shows an exemplary slide bearing in schematic sectional view.

The structure of an exemplary slide bearing is shown in FIG. 1. Here, the metal support is denoted by 1, while 2 denotes the primer layer, 3 denotes the adhesive layer and 4 denotes the sliding layer applied thereto.

In an embodiment, the intermediate layer 3 comprises a primer layer which can include an oligomeric condensate of at least one silanol. The silanol features a polar moiety and an organic residue moiety. The polar moiety that has an affinity to adhere to support materials, such as metal support 1. Moreover the polar moiety of the silanol may condense or oligomerize to form a network or a sheet which increases the adhesion to the metal support. The organic residue moiety has an affinity to interact with the adhesive layer 3 depending from type, length, and physical-chemical properties of the organic residue. For example, the organic residue can interact with the adhesive layer through van-der-Waals forces, covalent bonds, or a combination thereof.

In embodiments the silanols that form primer layer 2 can be selected from the group having the formula:

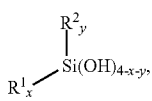

wherein x is 1 or 2, y is 0 or 1.

The moieties $R^1$ and $R^2$ can be the same or different. The moieties $R^1$ and $R^2$ can be selected from the group consisting of methyl, ethyl, n-propyl, i-propyl, and a functionalized alkyl group $R'-(CH_2)_z-$, wherein z is at least 1. In embodiments, z can be 1, 2, 3, 4, or 5. In other embodiments, z is not greater than 10, such as not greater than 8, not greater than 7, not greater than 6, not greater than 5, not greater than 4, or not greater than 3.

In embodiments, R' can be selected from the group consisting of vinyl, difluorovinyl, trifluoromethyl, pentafluoroethyl, heptafluoropropyl, nonafluorobutyl, undecafluoropentyl, tridecafluorohexyl, pentadecafluoroheptyl, heptadecafluorooctyl, methoxy, ethoxy, trifluoromethoxy, pentafluoroethoxy, heptafluoroproxy, nonafluorobutoxy, undecafluoropentoxy, tridecafluorohexanoyl, pentadecafluoroheptanoyl, heptadecafluorooctanoyl, dimethyl amino, diethlyamino, di(trifluoromethyl)amino, and di(pentafluoroethyl)amino.

In embodiments, the silanol can be selected from the group consisting of:

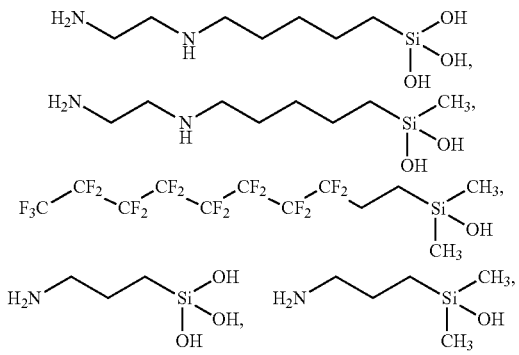

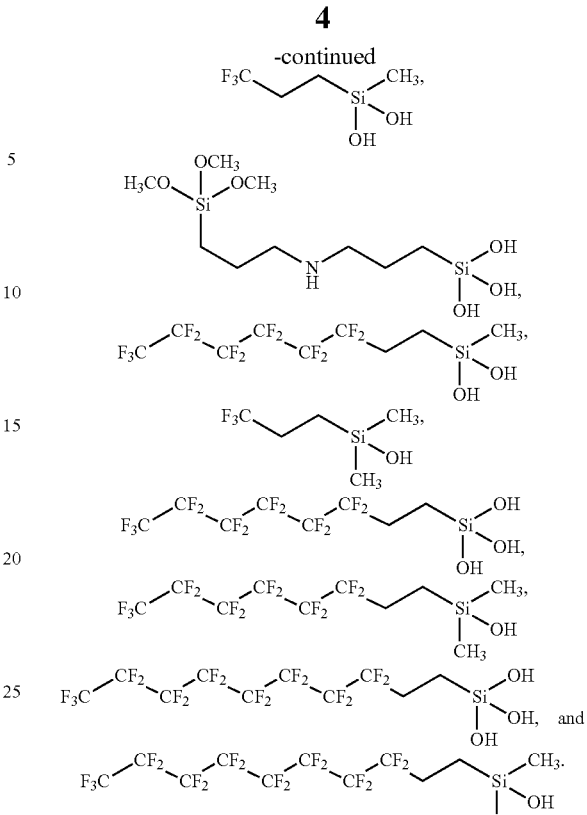

In other embodiments, two silanols can be mixed to form the primer layer. The two silanol can be any two silanols of the aforementioned formulas. In yet further embodiments, two or more silanols can be mixed to form the primer layer.

Moreover, two silanols can be mixed in any weight ratio. For example, two silanols can be mixed in a weight ratio of at least about 1:1, such as at least about 2:1, at least about 3:1, at least about 4:1, at least about 5:1, at leas about 10:1, at least about 20:1, or at least about 50:1. Furthermore, it is contemplated to have any mixture of any two silanols mixed with a third silanol in any weight ratio. Moreover, it is contemplated to mix any two mixtures of two silanol to form a blend of silanols that form the primer layer.

In embodiments, the primer layer 2 has a thickness of at least about 0.2 microns, such as at least about 0.5 micron, at least about 0.8 microns, at least about 1 micron, at least about 1.5 microns, at least about 2 microns, at least about 2.5 microns, or at least about 3 microns. In yet other embodiments, the thickness is not greater than about 5 microns, such as not greater than about 4.5 microns, not greater than about 4 microns, not greater than about 3.5 microns, not greater than about 3 microns, not greater than about 2.5 microns, or not greater than about 2 microns.

In yet further embodiments, the primer layer 2 and the adhesive layer 3 can have a combined thickness of at least about 2 microns, such as at least about 4 micron, at least about 6 microns, at least about 8 microns, or at least about 10 microns.

The adhesive layer 3 comprises an adhesive layer comprising a thermoplastic polymer or a blend of thermoplastic polymers. The thermoplastic polymers can include perfluoroalkoxyethylene (PFA), tetrafluoroethylene-perfluoro (methyl vinyl ether) copolymer (MFA), ethylene tetrafluoroethylene (ETFE), tetrafluoroethylene-hexafluoropropylene (FEP), and any combination thereof.

In an embodiment, the adhesive layer 3 can include a polymer blend of thermoplastic polymers. The blend can include at least two thermoplastic fluoropolymers P1 and P2, wherein P1 is selected from perfluoroalkoxyethylene (PFA) or tetrafluoroethylene-hexafluoropropylene (FEP). P2 is different from P1 and can be a polymer selected from tetrafluoroethylene-hexafluoropropylene (FEP), modified tetrafluoroethylene-hexafluoropropylene (mFEP), perfluoroalkoxyethylene (PFA), modified perfluoroalkoxyethylene (mPFA), polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), and polyetherketone (PEK).

The blend of P1 and P2 can be in any a weight ratio. For example the weight ration of P1:P2 can be about 1:99, about 5:95, about 10:90, about 15:85, about 20:80, about 25:75, about 30:70, about 35:65, about 40:60, about 45:55, or about 50:50.

In another embodiment, the adhesive layer 3 can comprise at least three fluoropolymers P1, P2, and P3, wherein P1 is perfluoroalkoxyethylene (PFA), P2 is tetrafluoroethylene-hexafluoropropylene (FEP). P3 is different from P1 and P2. P3 can be a polymer selected from modified tetrafluoroethylene-hexafluoropropylene (mFEP), modified perfluoroalkoxyethylene (mPFA), polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), polyethersulfone (PES), and polyetherketone (PEK).

In embodiments, each of the polymer of the adhesive layer 3 can be present at various weight percentages. For example, P1 can comprise at least about 1 wt %, at least about 2 wt %, at least about 5 wt %, at least about 10 wt %, at least about 20 wt %, at least about 30 wt %, at least about 40 wt %, or at least about 50 wt % of the adhesive layer. In other embodiments, P2 can comprise at least about 1 wt %, at least about 2 wt %, at least about 5 wt %, at least about 10 wt %, at least about 20 wt %, at least about 30 wt %, at least about 40 wt %, or at least about 50 wt % of the adhesive layer. In yet other embodiments, P3 or any subsequent polymer can comprise can comprise at least about 1 wt %, at least about 2 wt %, at least about 5 wt %, at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, or at least about 95 wt % of the adhesive layer.

In yet other embodiments, some polymers of the blend for the adhesive layer 3 do not exceed certain weight percentages. For example, the weight percentage of P1 is not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the adhesive layer. In other embodiments, the weight percentage of P2 is not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the adhesive layer. In yet other embodiments, the weight percentage of P3 or any subsequent polymer is not greater than about 95 wt %, not greater than about 90 wt %, not greater than about 80 wt %, not greater than about 70 wt %, not greater than about 60 wt %, not greater than about 50 wt %, not greater than about 40 wt %, not greater than about 30 wt %, not greater than about 20 wt %, not greater than about 10 wt %, not greater than about 5 wt %, not greater than about 2 wt %, or not greater than about 1 wt % of the adhesive layer.

Variation of the ratio of polymers P1, P2 and P3 provides for changes in the MFI (melt flow index), as specified by DIN EN ISO 1133, which is incorporated herein in its entirety. The MFI is determined by the mass of polymer that can extrude through an orifice of defined dimensions at a specified temperature and load within 10 minutes. In general, the load is 5 kg and the temperature is approximately the melting point of the material to be characterized. For example, PFA has a melting point of approximately 372° C. and FEP or ETFE have melting points of approximately 297° C.

In embodiments, the MFI of the adhesive can be from 1 to 100 g/10 min, such as from 2 to 50 g/10 min, or from 3 to 25 g/10 min.

The sliding layer 4 applied to the adhesive layer 3 can be a PTFE compound tape, in particular as a surface-pretreated, preferably etched, PTFE compound tape. The PTFE compound layer 4 used can contain various fillers to improve the mechanical properties, e.g. fibers, inorganic materials, thermoplastic materials, or mineral materials, or mixtures thereof. Examples of fibers can include glass fibers, carbon fibers, and aramids. Examples of inorganic materials can include ceramic materials, carbon, glass, graphite, aluminum oxide, molybdenum sulfide, tungsten disulfide, bronze, and silicon carbide. The inorganic materials can be in the form of woven fabrics, powders, spheres, or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), and aromatic polyesters (Ekonol). Examples of mineral materials can include wollastonite and barium sulfate.

In other embodiments, the sliding layer includes PTFE, polyamide (PA), polyimide (PI), polyether ether ketone (PEEK), or a mixture thereof. In one embodiment, the sliding layer is perforated, air-permeable, or both.

In a further embodiment, the sliding layer 4 has a thickness of at least about 0.01 mm, such as at least about 0.05 mm, at least about 0.1 mm, or at least about 0.2 mm. In other embodiments, the sliding layer 4 has a thickness of not greater than about 2.0 mm, such as not greater than about 1.5 mm, not greater than about 1.0 mm, not greater than about 0.8 mm, not greater than about 0.5 mm, not greater than about 0.4 mm, or not greater than about 0.35 mm. In other embodiments, the sliding layer 4 has a thickness in a range from about 0.2 mm to about 0.4 mm, such as from about 0.2 mm to about 0.25 mm and from about 0.28 mm to about 0.32 mm. In one particular embodiment, the sliding layer has a thickness has a thickness of about 0.24 mm. In another particular embodiment, the sliding layer has a thickness has a thickness of about 0.30 mm.

In embodiments, where the sliding is made of various polymers, such sliding layer can further comprise at least one filler. selected from fibers, glass fibers, carbon fibers, aramids, inorganic materials, ceramic materials, carbon, glass, graphite, aluminum oxide, molybdenum sulfide, tungsten disulfide, bronze, silicon carbide, woven fabrics, powders, spheres or fibers, thermoplastic materials, in particular polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), mineral materials, wollastonite, barium sulfate, or mixtures thereof. The filler can be in a proportion from about 1 to about 40% by volume, from about 5 to about 30% by volume, from about 10 to about 20% by volume.

Figure 2:
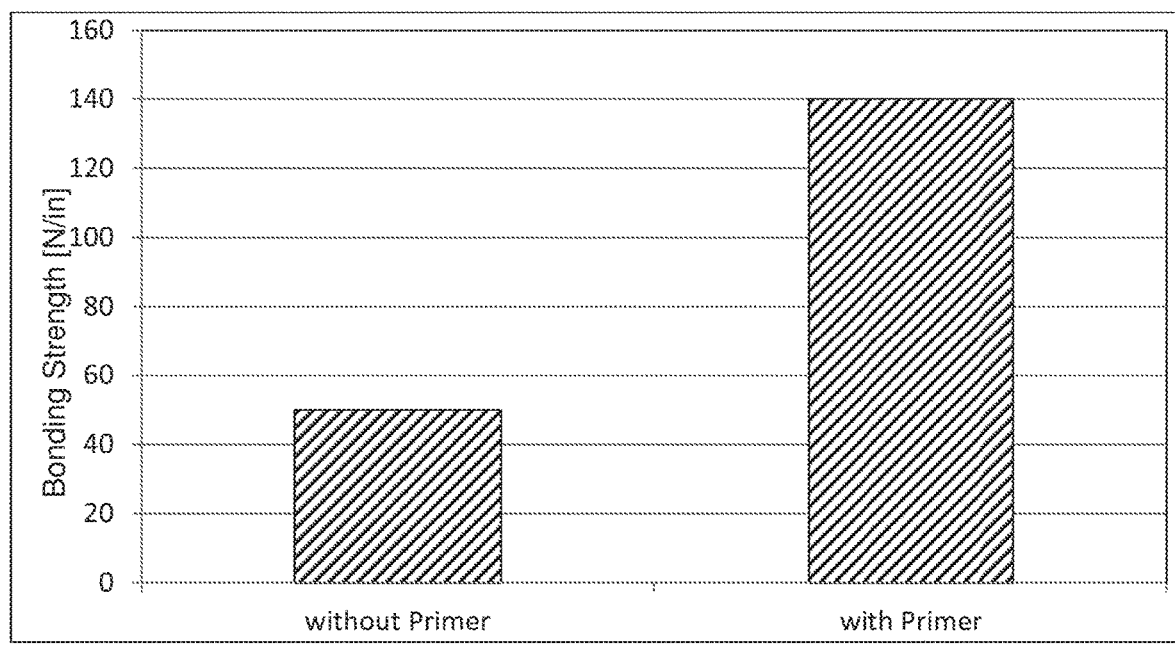
FIG. 2 shows a comparison graph of adhesive strength tests on slide bearings according to an embodiment.

In an embodiment, the slide bearing can be characterized by improved adhesion of the sliding layer 4 to the support material 1 brought about by the adhesive layer 3 and the primer layer 2. FIG. 2 displays the bonding strength of a sliding layer in the presence and absence of the primer layer 2.

Owing to the improved adhesion to even an unpretreated surface of the metal support, in particular to cold-rolled steel, cold-rolled and subsequently electrolytically zinc-plated steel, aluminum, or stainless steel, ecologically problematical and disposal-intensive wet chemical pretreatment processes, in particular chromating, can be dispensed with.

Physical processes for surface pretreatment of the adhesive (e.g. plasma pretreatment by corona discharge) as are described, for example, in EP 0 848 031 B1 in which a functionalized thermoplastic fluoropolymer is likewise described as constituent of a laminate, are no longer necessary, as studies carried out by the applicant have shown. The process for producing the slide bearing can therefore be carried out at significantly lower costs and with less ecological impact compared to the prior art.

The metal support can be of any structure or shape. In embodiments, the metal support can be a plate, a sheet, a woven fabric, a mesh, or metal foam. In embodiments, the metal support includes steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

In other embodiments, the metal support can have a coating. The coating can be a layer of another metal or alloy. In embodiments, the coating is a metal or alloy containing at least one of the following metals: chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, and bismuth.

In yet other embodiments, the coating can be a copper alloy, a copper-tin alloy, a copper-zinc alloy, a bronze, a phosphor bronze, a silicon bronze, a brass, or any combinations thereof.

In an embodiment, the metal support used in the slide bearing can have a surface of a varying nature. Owing to the improved adhesion properties of the adhesive layer with the primer system, the metal support can have either a smooth surface or a roughened or structured surface (for example, as achieved by brushing, sandblasting, embossing of a structure). Regardless of the surface roughness, the surface can also be modified to form a plated surface, such as an electrolytically zinc-plated surface.

The thickness of the adhesive layer can correspond essentially to the roughness of the metal support, defined as the distance $R_{max}$ between the maximum profile peak height and the maximum profile valley depth of the roughness profile of the surface of the metal support. In this way, it can be ensured that a sufficiently thick adhesive layer is applied to the metal support so that a full-area adhesive bond between sliding layer and metal support is ensured. The adhesive layer should also not be made too thick. In this case, there would be a risk that, on joining the layers, parts of the adhesive layer could be pressed out from the adhesive bond or cohesive rupture could occur within parts of the adhesive layer projecting above the roughness profile of the metal support surface when the slide bearing is subjected to shear stress. For example, the thickness can be at least about 1 micron, such as at least about 2 microns, at least about 3 microns, at least about 5 microns, at least about 10 microns, at least about 15 microns, or at least about 35 microns. In other embodiments, the thickness can be not greater than about 40 microns, such as not greater than about 35 microns, not greater than about 30 microns, not greater than about 25 microns, not greater than about 20 microns, not greater than about 15 microns, or not greater than about 10 microns.

The metal support can have an average surface roughness $R_a$ of less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, less than about 1 micron.

The slide bearing according to any one of the preceding claims, wherein the metal support has an average surface roughness $R_a$ of at least about 0.01 micron, at least about 0.02 micron, at least about 0.05 micron, at least about 0.1 micron, at least about 0.5 micron, at least about 1 micron, at least about 2 microns, at least about 5 microns, at least about 10 microns, at least about 20 microns, at least about 50 microns, at least about 100 microns, at least about 200 microns, at least about 500 microns.

In yet another embodiment, the metal support can have an average surface roughness $R_a$ in the range from about 0.1 micron to about 400 microns, from about 0.5 micron to about 100 microns, or from about 1 micron to about 50 microns.

To improve the mechanical and general physical properties of the slide bearing, the adhesive layer 3 can contain fillers. Fillers can increase and/or improve the thermal conductivity and/or the wear properties. Fillers can be fibers, inorganic materials, thermoplastic materials, mineral materials, or mixtures thereof. For example, fibers can include glass fibers, carbon fibers, and aramids. Inorganic materials can include ceramic materials, carbon, glass, graphite, aluminum oxide, molybdenum sulfide, tungsten disulphide, bronze, and silicon carbide. The inorganic materials can be in the form of woven fabrics, powders, spheres or fibers. Examples of thermoplastic materials can include polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyetherketone (PEK), and aromatic polyesters (Ekonol). Example of mineral materials can include wollastonite and barium sulfate.

The proportion of filler in the adhesive layer 3 can be from about 1 to about 40% by volume, such as from about 5 to about 30% by volume, from about 10 to about 25% by volume, or even from about 20 to about 25% by volume. The thickness of the intermediate layer 3 can be in the range from about 0.001 mm to 0.4 mm, such as from 0.01 to 0.05 mm.

In an embodiment, a method of producing a slide bearing includes applying a primer liquid onto a metal support. The primer liquid can include at least one silanol or an oligomeric condensate of at least one silanol. The silanol can be selected from the group having the formula

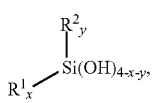

wherein x is 1 or 2, y is 0 or 1.

The moieties $R^1$ and $R^2$ can be the same or different. The moieties $R^1$ and $R^2$ can be selected from the group consisting of methyl, ethyl, n-propyl, i-propyl, and a functionalized alkyl group $R'$—$(CH_2)_z$—, wherein z is at least 1. In embodiments, z can be 1, 2, 3, 4, or 5. In other embodiments, z is not greater than 10, such as not greater than 8, not greater than 7, not greater than 6, not greater than 5, not greater than 4, or not greater than 3.

The method can further include drying the primer liquid to form a primer layer. The method can further include applying an adhesive precursor onto the primer layer to form an adhesive layer. Moreover, the method can include applying a sliding layer onto the adhesive layer.

In embodiments, applying of the primer liquid can include spraying, brushing, and dip coating. The primer liquid can include an organic solvent, water, or a combination thereof. In embodiments, the organic solvent can be methanol, ethanol, propanol, iso-propanol, butanol, diethyl ether, tetrahydrofuran, acetone, ethyl acetate, or any combination thereof.

The adhesive precursor can be in the form of a film, a foil, a powder, or any combination thereof. The adhesive is thereby generated upon thermal treatment, e.g., during the lamination process when the sliding layer is applied onto the metal support.

In embodiments, the sliding layer can be applied by laminating, by coiling, by paste spreading, or any combination thereof. For paste spreading, a sliding precursor in form of a paste or high viscous slurry is applied onto the adhesive or the adhesive precursor followed by a drying, calendar, or curing step, which result in the sliding layer laminated onto the metal support.

In another embodiment, a filler of the group of filler listed above can be added to the sliding layer precursor or the adhesive precursor.

In one embodiment, both the metal support and the sliding layer are in each case rolled off a roll as continuous material. Primer liquid is applied to the metal support followed by adhesive precursor. The layers are joined to one another under pressure and at elevated temperature in a laminating roller apparatus. To achieve further-improved adhesion of the adhesive layer to the metal support together with improved corrosion properties of the metal support, an embodiment of the process provides for the surface of the metal support to be roughed and/or surface-upgraded. In other embodiments, the method can include coating the metal surface.

The surface of the metal support can be treated by electrolytic zinc-plating to roughen, upgrade, or coat the surface. This is done before application of the adhesive layer. In other embodiments, the surface area of the metal support can be increased by mechanical structuring.

The structuring can include brush-finishing, sand-blasting, etching, perforating, pickling, punching, pressing, curling, deep drawing, decambering, incremental sheet forming, ironing, laser cutting, rolling, hammering, embossing, undercutting, and any combinations thereof. For example, embossing of a structure, allows for the possibility of intermeshing, which has a positive effect on the resulting bonding forces.

In another embodiment, the surface of the metal support can be degreased. Degreasing can be done by a washing process with a soap solution and/or rinsing with an organic solvent. Solvents for the degreasing process can be acetone, ethanol, isopropyl alcohol, or any combination thereof. Alternatively, an ammonia solution, such as a 0.5% ammonia solution can be used.

In an embodiment, the improved adhesive strength can be determined by means of a 180° peel test using sandwich laminates.

EXAMPLES

180°-T-peel-test

The 180°-T-peel test is described in DIN EN 1895, which is incorporated herein in its entirety. Strips of specimens having a five-layer structure are prepared. The layer set-up is: Steel backing, adhesive, sliding layer, adhesive, steel backing. The strips have a width of 25 mm. Clamps are affixed at one end to the opposing steel lips. The steel backings are pulled apart and the peel force for separating the steel backings is measured.

In one experiment, strips are prepared having ETFE as material for the adhesive layer. Cold-rolled steel of the grade 1.0338 is selected as metallic backing and a PTFE compound tape having a filler content of 25% is selected as sliding layer. In one experiment the metallic backing is treated with a primer liquid to form a primer layer from an aminopropylsilanol-condensate.

As the experimental results presented in FIG. 2 show, in the absence of the primer, the bonding strength was measured to be 50 N/in. In the presence the bonding strength almost tripled to about 140 N/in.

Slide bearings can be prepared in a vast number of very different shapes and sizes. The smallest bearing, also called a pico bearing, is only a few μm in height compared to bearings for other applications that could be up to 500 mm.

Slide Bearings can include plane bearings, annular bearings, bushings, balljoint bearings (half spheres), plain bearings, axial bearings, thrust bearings, linear bearings, bearing shells, bearing cups and combinations thereof.

It is advantageous that the bearing is maintenance free. The term "maintenance-free" describes bearings that do not need to be greased as was the case for bearings in early car doors. Yet, the life time of maintenance-free bearings exceeds the average life time of the product these bearings are incorporated or the life time of conventional bearings applied for the same purpose.

Slide bearings are applied in a broad spectrum of commercial industry ranging from the heavy metal industry to the automotive and bike industry, even into baking industry, laptop/mobile phone hinges, bearings for solar applications and more Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of producing a slide bearing, comprising:
   applying a primer liquid onto a metal support, the primer liquid consisting essentially of at least one silanol, an oligomeric condensate of at least one silanol, or combination thereof, wherein the at least one silanol is selected from the group having the formula

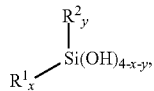

wherein x is 1 or 2, y is 0 or 1,
wherein R 1 and R 2 are the same or different and are selected from the group consisting of methyl, ethyl, n-propyl, i-propyl, and a functionalized alkyl group R'—(CH 2)z—, wherein z is at least 1;
drying the primer liquid to form a primer layer,
applying an adhesive layer onto the primer layer, and
applying a sliding layer onto the adhesive layer.

2. The method according to claim 1, wherein the applying of the primer liquid includes spraying, brushing, and dip coating.

3. The method according to claim 1, wherein the primer liquid comprises an organic solvent, water, or a combination thereof.

4. The method according to claim 3, wherein the organic solvent is selected from methanol, ethanol, propanol, isopropanol, butanol, diethyl ether, tetrahydrofuran, acetone, ethyl acetate, or any combination thereof.

5. The method according to claim 1, wherein the adhesive layer is in the form of a film, a foil, a powder, or any combination thereof.

6. The method according to claim 1, wherein applying the sliding layer includes laminating, coiling paste spreading a sliding precursor and curing, or any combination thereof.

7. The method according to claim 1, wherein the adhesive layer is selected from the group consisting of perfluoroalkoxyethylene (PFA), tetrafluoroethylene-perfluoro(methyl vinyl ether) copolymer (MFA), ethylene tetrafluoroethylene (ETFE), tetrafluoroethylene-hexafluoropropylene (FEP), and any combination thereof.

8. The method according to claim 1, wherein R' is selected from the group consisting of vinyl, difluorovinyl, trifluoromethyl, pentafluoroethyl, methoxy, ethoxy, trifluoromethoxy, pentafluoroethoxy, dimethyl amino, diethylamino, di(trifluoromethyl)amino, and di(pentafluoroethyl)amino.

9. The method according to claim 1, wherein the at least one silanol is selected from the group consisting of:

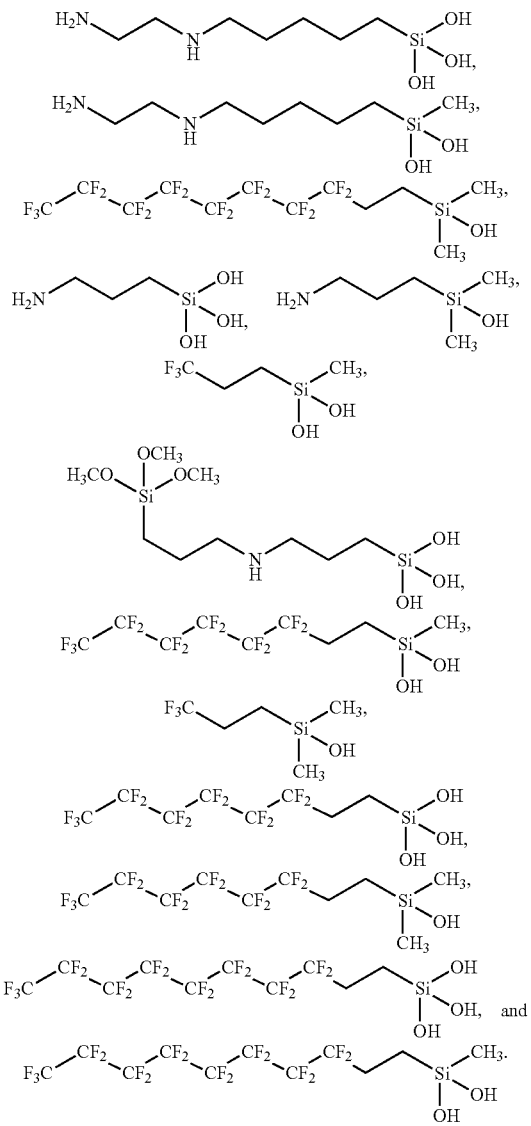

10. The method according to claim 1, wherein z is not greater than 10.

11. The method according to claim 1, wherein the primer layer has a thickness of at least about 0.2 microns and not greater than about 5 microns.

12. The method according to claim 1, wherein the primer layer and the adhesive layer have a combined thickness of at least about 2 microns and not greater than about 50 microns.

13. The method according to claim 1, wherein a thickness of the primer layer and the adhesive layer corresponds essentially to a roughness of the metal support defined as the distance between the maximum profile peak height and the maximum profile valley depth of the roughness profile (Rmax) of the surface of the metal support of at least about 1 micron not greater than about 40 microns.

14. The method according to claim 1, wherein the adhesive layer comprises a filler.

15. The method according to claim 1, further comprising applying a coating onto the metal prior to applying the primer liquid.

16. The method according to claim 15, wherein the coating is an electrolytically plated metal selected from the group consisting of chromium, molybdenum, tungsten, manganese, ruthenium, osmium, cobalt, rhodium, iridium, nickel, palladium, platinum, copper, silver, gold, zinc, and cadmium.

17. The method according to claim 1, wherein the metal support comprises steel, cold-rolled steel, material No. 1.0338 or 1.0347, matt zinc-plated steel, stainless steel, material No. 1.4512 or 1.4720, aluminum, bronze, alloys, or any combinations thereof.

18. The method according to claim 1, wherein the sliding layer comprises polytetrafluoroethylene, polyamide, polyimide, polyether ether ketone, or a mixture thereof.

19. The method according to claim 1, further comprising rendering the sliding layer perforated, air-permeable, or both.

20. The method according to claim 1, wherein the sliding layer comprises at least one filler.

* * * * *

UNITED STATES PATENT AND TRADEMARK OFFICE
CERTIFICATE OF CORRECTION

PATENT NO. : 10,563,696 B2
APPLICATION NO. : 16/144164
DATED : February 18, 2020
INVENTOR(S) : Olaf Schmitjes It is certified that error appears in the above-identified patent and that said Letters Patent is hereby corrected as shown below:

In the Claims

Column 13, Line 15, Claim 13: please delete "micron not", and insert --micron and not--

Signed and Sealed this
Twenty-seventh Day of September, 2022

Katherine Kelly Vidal
*Director of the United States Patent and Trademark Office*